United States Patent [19]

King et al.

[11] 4,337,886
[45] Jul. 6, 1982

[54] WELDING WITH A WIRE HAVING RAPIDLY QUENCHED STRUCTURE

[75] Inventors: William H. King, Higganum; Bernard H. Kear, Madison, both of Conn.

[73] Assignee: United Technologies Corporation, Hartford, Conn.

[21] Appl. No.: 146,949

[22] Filed: Apr. 28, 1980

Related U.S. Application Data

[63] Continuation of Ser. No. 28,404, Apr. 9, 1979, abandoned.

[51] Int. Cl.³ .............................................. B23K 35/30
[52] U.S. Cl. .................................. 228/263 B; 148/39; 219/137 WM
[58] Field of Search ......................... 148/39, 32, 32.5; 428/606; 75/171; 228/263 B; 219/137 R, 137 WM

[56] References Cited

U.S. PATENT DOCUMENTS

| | | | |
|---|---|---|---|
| 745,786 | 12/1908 | Cole | 164/423 |
| 2,825,108 | 3/1958 | Pond | 428/606 |
| 3,812,901 | 5/1974 | Stewart | 164/463 |
| 3,838,185 | 9/1974 | Maringer et al. | 264/8 |
| 3,845,805 | 11/1974 | Kavesh | 164/462 |
| 3,862,658 | 1/1975 | Bedell | 164/463 |
| 3,881,540 | 5/1975 | Kavesh | 164/463 |
| 3,881,541 | 5/1975 | Bedell | 164/480 |
| 3,938,583 | 2/1976 | Kavesh | 164/423 |
| 4,025,314 | 5/1977 | Sadowski et al. | 75/171 |
| 4,042,383 | 8/1977 | Petersen et al. | 75/171 |
| 4,122,240 | 10/1978 | Banas et al. | 148/39 |
| 4,148,973 | 4/1979 | Sexton et al. | 75/171 |
| 4,169,744 | 10/1979 | D'Silva | 75/171 |
| 4,219,592 | 8/1980 | Anderson et al. | 75/171 |
| 4,250,229 | 2/1981 | Kear et al. | 428/606 |
| 4,260,666 | 4/1981 | De'Cristofaro et al. | 75/171 |

*Primary Examiner*—Peter K. Skiff
*Attorney, Agent, or Firm*—C. G. Nessler

[57] ABSTRACT

A wire of a normally nonforgeable composition, having improved resistance to fracture during working, handling and use is comprised of a portion with a rapidly quenched structure as a continuous stratum along its length. A preferred wire useful for fusion welding has a circular cross section with a microcrystalline surface portion of at least 30 volume percent of the wire. Other preferred wires have elliptical or rectangular cross sections with amorphous strata continuous along their lengths.

4 Claims, 2 Drawing Figures

WELDING WITH A WIRE HAVING RAPIDLY QUENCHED STRUCTURE

This is a continuation of application Ser. No. 028,404, filed on Apr. 9, 1979, now abandoned.

BACKGROUND OF THE INVENTION

1. This invention relates to welding with wire products, more particularly with bendable wires of normally unmalleable alloys suited for uses such as weld filler metals.

2. The fabrication of wire of metal alloys which are readily forged or drawn is easily undertaken. However, a considerable number of alloys can be readily cast but their metallurgical structure is such that they cannot be formed into wires by conventional cold or hot working processes. It is with these types of alloys that the present invention is particularly useful. Among these alloys are high temperature cobalt and nickel base superalloys, including those used for structural and hardfacing applications. To accomplish most types of welding it is desired to have filler metals in rod or wire form, and it is within this applied context that the invention is described in detail.

Nonforgeable welding alloys can presently be made into suitable wires by either casting or powder metal processes. In the former, wires are typically formed by centrifugally casting small rods; the minimum diameters and the maximum length-to-diameter ratios are limited according to known factors relating to castability. Alternatively, the alloys can be converted into a powder, as by atomization, and then pressed or extruded into wires of the desired diameter; however, these processes can be costly and small diameters are difficult to obtain. In both the foregoing instances, the rod or wire will still have the unyielding character of the cast alloy. And the minimum diameters that are formable from most alloys using these techniques are greater than those often desired for welding small workpieces. The diameter of oversize wires can be reduced by centerless grinding, for example, but such an operation is costly and results in the loss of valuable welding wire alloy.

Generally, even with inefficiency, most cast alloys cannot readily be made into wires of less than 1 mm diameter, and when they are made at diameters near the minimum, they tend to be rather fragile and prone to breakage during handling, if dropped or bent. Because of these constraints, small diameter wires usually come in relatively short lengths of about 20–40 cm. Therefore, they are not suited for continuous fusion welding processes such as GMA (Gas Metal Arc), but must be used in hand-fed GTA (Gas Tungsten Arc) processes instead, with attendant inefficiency in production and weld wire consumption.

Thus, there is a need for an improved small diameter weld filler metal wire which has sufficient malleability to endure the moderate bending that is characteristically imposed by automatic welding wire feeders. The improved wire will not be prone to undue breakage during normal handling or welding operations.

In our U.S. Pat. No. 4,250,229 entitled "Interlayers With Amorphous Structure For Brazing And Diffusion Bonding" we describe metal foils wherein a portion of the interlayer has an amorphous structure which imparts ductility to normally brittle alloys which melt during brazing and bonding processes.

SUMMARY OF THE INVENTION

An object of the invention is to provide an improved cast metal weld filler metal wire which is malleable. A further object is to economically provide small diameter wires of normally nonforgeable alloys. A still further object is to provide cast wires which can be drawn to smaller diameters.

In accord with the invention, a wire has at least a portion of its cross section as a continuous stratum with a rapidly quenched metallurgical structure. The rapidly quenched structure, which may be either microcrystalline or amorphous, is relatively ductile and thereby imparts plastic structural deformability to the otherwise relatively unmalleable wire. When the wire is less than fully rapidly quenched, such portions as are of a conventional crystalline atomic structure and are prone to fracture during bending of the wire are supported and functionally held intact by the rapidly quenched stratum to which they are integrally attached. The wire may be of virtually any cross section, but a preferred embodiment for welding is a generally circular cross section. In a circular cross section welding wire of the preferred embodiment, the rapidly quenched stratum may be a continuous layer around the circumference. Welding wires in accord with the invention may be made by rapidly solidifying liquid metals, laser surface melting of the surface of a previously cast wire, and any other means which achieve rapid quenching from the liquid of a portion of the wire.

Features and advantages of the invention include: making feasible the use of automatic filler metal wire feeding, reducing loss of wire due to breakage from handling, making available smaller diameter wires requiring less heat input to small workpieces, and more efficiently utilizing costly raw materials. Better control of parameters and joint properties are attained with automatic welding operation which is permitted with malleable wires. Also, articles having welded areas, particularly those containing localized areas of hardfacing materials, may be more readily fabricated with less deleterious effects on the substrate and less machining after welding when smaller diameter wire is available.

The foregoing and other objects, features and advantages of the present invention will become more apparent from the following description of preferred embodiments and accompanying drawings.

DESCRIPTION OF THE PREFERRED EMBODIMENT

The invention is described in terms of a cobalt base superalloy hardfacing wire, such as is suitable for use on gas turbine superalloy airfoils. But, as will be evident from the description, the invention is equally applicable with other materials.

PWA-694 is a commercial hardfacing alloy having the following composition: 28% chromium, 19.5% tungsten, 0.85% carbon, 5% nickel, 1% vanadium, balance cobalt, all by weight. Normally, this wire is centrifugally cast into nominal 6 mm diameter rods, 30–40 cm in length. Presently, for particular applications, it is centerless ground to a wire of about 1.5 mm, whereafter, in one application, the wire is used with the GTA process to apply a wear resistant layer of about 1.5–2.5 mm thick on a substrate, such as the nickel superalloy B-1900. PWA-694 is an alloy which lacks forgeability. In this patent specification, by lack of forgeability it is meant that an alloy in its cast form lacks sufficient malleability to be shaped by application of pressure and temperature, such as are used in conventional open and closed die forging and wire drawing.

According to the invention, welding is accomplished with an improved weld filler metal wire which is a filament having a portion with rapidly quenched structure. Methods of making continuous filaments from liquid metal are disclosed in the technical literature and in U.S. Pat. Nos. 2,825,108, 3,812,901, 3,938,583, 3,881,540, 3,862,658 and 3,881,541. Generally, these methods involve contacting or withdrawing a thin stream of metal from a melt with a cool surface or media on a continuous basis. U.S. Pat. No. 4,122,240 describes the creation of rapidly quenched microstructures on previously made articles. The techniques for making filaments with partial or wholly rapidly quenched structures are described and referred to in our U.S. Pat. No. 4,250,229 which is hereby incorporated by reference.

As described in more detail below, the rapidly quenched portion of the wire must have certain metallurgical characteristics to enable practice of the invention. Generally, these characteristics are those which impart ductility to the metal, compared to the characteristics it has when conventionally quenched.

Because of the requisite high cooling rates, currently manufactured filaments with totally rapidly quenched structure tend to be relatively small, typically having one dimension on the order of 0.15 mm or less. Wires of such small dimension are not preferred for most applications, e.g., a 0.8 mm or greater diameter being preferred in the practice of the invention. In many alloys, we believe that attainable cooling rates may be insufficient in the center of the wire to convert that portion into a rapidly quenched structure, but that at least the surface may be rapidly quenched according to one or more of the known techniques referred to herein.

Figure 1:
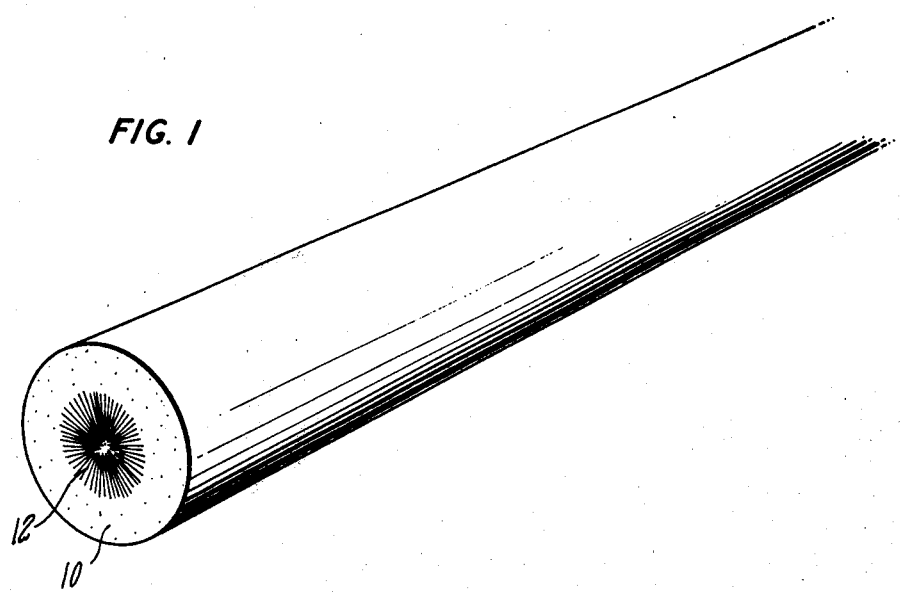
FIG. 1 shows a partially rapidly quenched structure wire with a circular cross section.

A preferred embodiment of a weld filler metal wire of the present invention is shown in FIG. 1. A stratum of rapidly quenched structure material 10 surrounds a core of conventionally quenched material 12. Since the rapidly quenched material will exhibit significant ductility upon deformation beyond its elastic limit, in contrast to the conventionally quenched material 12 which will exhibit cracking, the rapidly quenced stratum provides support to the wire and will maintain it as a single piece during bending. Of course, FIG. 1 shows a uniform stratum around the wire circumference but lesser degrees of uniformity will be acceptable, so long as one stratum is continuous along the length.

Figure 2:
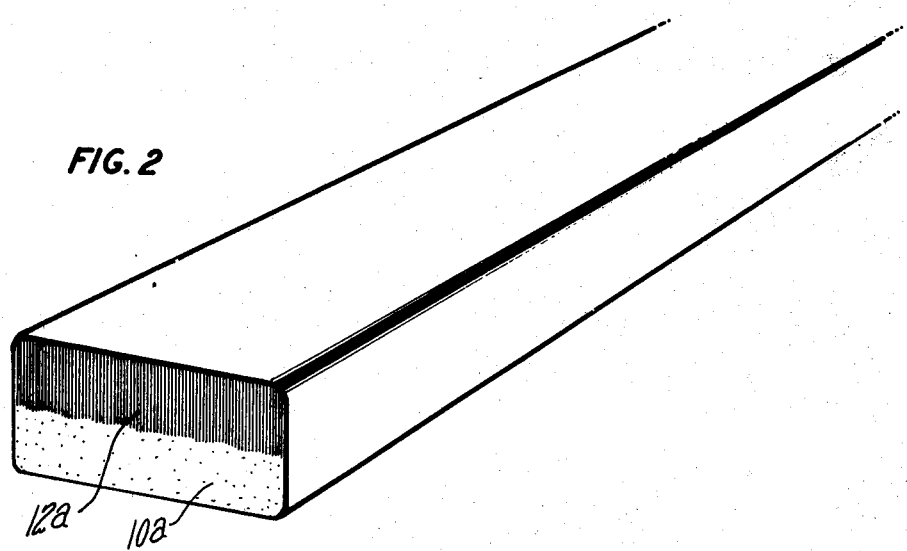
FIG. 2 shows a rectangular cross section wire.

Another embodiment of the invention is shown in FIG. 2 wherein the filament has a generally rectangular cross section characterized by rapidly quenched stratum 10a integrally attached to a length-continuous conventionally quenched stratum 12a. A wire as shown in FIG. 2 would result when a filament was subjected to rapid cooling from only one of its surfaces, namely, that at which the rapidly quenched structure 10a is present. Of course, the filament of FIG. 2 will exhibit different structural limits of deformation, depending on the axis about which it is deformed. The circular cross section wire shown in FIG. 1 will have structural properties primarily provided by the rapidly quenched stratum, since this portion is most favorably disposed to contribute to the section modulus during bending. Other cross-sectional embodiments, both regular and irregular will be within the contemplation of the invention, but for welding generally, regular cross sections are preferred. An ellipsoid is an example of another useful cross section. As will be evident from the description herein, wires of the invention will be bendable. Thus, wires may be formed to a first dimension, and with the integrity provided by the rapidly quenched layer, may thereafter be swaged or drawn down to a smaller second diameter in some instances.

To practice the invention while welding, for example, it is only required that the filler metal wire have a rapidly quenched stratum of sufficient thickness to provide structural support to the wire when it is deformed to a degree that causes cracking in the conventionally quenched material. We have not run experiments to evaluate the limits of the relative ratios between the conventionally quenched portion and the rapidly quenched portion and, of course, the limit will be dependent on the degree and direction of deformation which is anticipated. For a wire which is usable in normal GTA welding operations, where the limiting factor is the normal handling of the material, we believe that a rapidly quenched layer which comprises as little as 10 percent of the volume of the wire could be suited to practice the invention. Naturally, a greater percentage of rapidly quenched material would be even better. For applications where the wire is fed by a machine, as by rollers and the like, a higher volume fraction is probably desirable; we estimate that 20–30 volume percent or greater will be satisfactory.

The structure which results when a metal is quenched depends on the metal composition and the cooling rate to which it is subjected; determining this is largely a matter of experiment. In the discussion herein, quenching is divided into that characterized as conventional and that characterized as rapid.

Normal casting practice for forming ingots and articles entails such slow cooling that it is largely irrelevant here. Conventional quenching, as used herein, refers to cooling rates which are characteristic of welding joints and casting small (6 mm) diameter wires. These rates are of the order of $10^{3°}$ C. per sec. or less. When such cooling rates are applied to an alloy such as PWA-694, the microstructure will be characterized by segregation and further may contain casting imperfections such as porosity. These substantially degrade the ductility, and hence, the handling characteristics of the wire. The cooling rate is slow enough to permit the segregation of the carbide phases. Similar segregation will be observed in other alloys strengthened by other phases. Conventionally quenched alloy grain sizes will characteristically be of the order of 60–80 microns or greater. It is the combination of the grain size and the segregated hardening phase which imparts the lack of malleability and forgeability to the cast material.

Rapid quenching comprises cooling a metal at rates beyond those commonly encountered. Rapid quenching, as used herein, it that quenching which achieves either a microcrystalline or amorphous structure in a metal. When metal alloys are rapidly quenched, the exact structure produced depends on the alloy composition and the cooling rate. For example, to obtain amorphous structures, that is, those characterized by a lack of long range atomic ordering, it is necessary to cool a metal at a rate sufficient to preserve the metastable structure characteristic of a liquid. For example, to obtain amorphous structures, it is necessary to cool elemental metals at rates greater than about $10^{13°}$ C. per sec., to cool precipitation strengthened superalloys at rates greater than about $10^{8°}$ C. per sec., and to cool certain favorably composed eutectic alloys at rates greater than about $10^{5°}$ C. per sec.

When metal alloys are rapidly quenched at rates between those characteristics of conventional quenching and those which produce amorphous structures, fine microcrystalline structures result. Fine microcrystalline structures, as used herein, are those which have average grain sizes of the order of ten micrometers or less and in which the hardening phases, such as carbides, are well dispersed and of the order of one tenth of a micrometer. The phases are very fine and well dispersed because the rapid cooling rate does not allow time for segregation to occur as it does in conventionally quenched metals. Thus, the rapidly quenched microcrystalline structure will impart improved ductility compared to that observed in the conventionally quenched metal. (Naturally, the grains in quenched metals will often be columnar, and in that respect, the grain and phase sizes recited herein will be understood to be nominal, but nonetheless significant by their contrast).

Both the amorphous structures and the microcrystalline structures will be characterized by chemical homogeneity and lack of large segregated phases. The differences will be in the ordering of the crystalline structure. Generally, the amorphous structure will always be characterized by improved ductility compared to the crystalline state. To achieve ductility in certain inherently brittle materials, e.g. a high metalloid content metal such as AMS 4775 (nominally, by weight percent, 16.5 Cr, 4 Si, 4 Fe, 3.8 B, balance Ni), it is necessary that quenching be sufficiently rapid to achieve the amorphous state. However, in other materials, such as precipitation hardened PWA-694, it is not necessary to achieve the amorphous state to attain ductility. Quenching at a sufficiently rapid rate to decrease grain size to the aforementioned microcrystalline range and suppress the normal tendency to carbide segregation will produce a sufficiently ductile stratum to which comprises a wire within the object of the invention.

Referring now again to the specific use of improved filler metal wire for welding, a usable wire will most often have a composition such that its melting point is approximately that of the workpieces. This is characteristic of fusion-welding wire. Of course, wire used for hardfacing or other purposes may have a lower melting point than the workpieces, but it will still be adapted to melt in contact with, and metallurgically alloy with, the workpieces. When the wire is placed in proximity to the workpieces and they and the workpieces are locally heated, melting and fusion take place. On removal of the heat, the liquid metal solidifies by heat extraction into the workpieces and heat loss from the weld region surface to the environment. A crystalline atomic structure weld zone results.

The weld filler metal wire of the invention will be usable in other welding processes besides the GTA and GMA processes mentioned above. Included, but not limiting, are processes such as electroslag welding, gas welding, and the like. The weld filler metal wire of the invention would also be suitable for other processes where metal is provided in wire form to be melted and applied to a substrate, as for example is carried out in spray metallizing.

As indicated, the invention is applicable to all types of wire for which there is a need for improved ductility for handling and working. Included in this scope are iron and nickel base alloys hardened by carbide and boride compounds, as well as inherently unforgeable cast alloys of other base metals, where rapid quenching alters the structure to eliminate the deleterious phases caused by conventional quenching.

Although this invention has been shown and described with respect to a preferred embodiment, it will be understood by those skilled in this art that various changes in form and detail thereof may be made without departing from the spirit and scope of the claimed invention.

Having thus described typical embodiments of our invention, that which we claim as new and desire to secure by Letters Patent of the United States is:

1. The method of fusion welding a superalloy workpiece which comprises heating the workpiece locally with a welding heat source and introducing weld filler wire into the vicinity of the workpiece where it is heated, to cause melting of the wire and fusion thereof with the superalloy workpiece, characterized by imparting to the weld filler wire a rapidly quenched structure prior to the introduction thereof into the vicinity of the heated workpiece, to make the wire at least partially amorphous or microcrystalline and to thereby provide a ductile portion on an otherwise brittle weld filler wire.

2. The method of claim 1 wherein the weld filler wire is a precipitation hardened alloy.

3. The process of claim 1 wherein the surface stratum portion comprises at least 20 percent by volume of the wire.

4. The method of claim 2 wherein the wire stratum has a nominal grain size no greater than 10 microns and hardening phases of an order of 0.1 microns in size.

* * * * *